United States Patent
Geyzersky et al.

(10) Patent No.: US 12,374,135 B2
(45) Date of Patent: Jul. 29, 2025

(54) SYSTEMS, METHODS AND PROGRAMS FOR GENERATING DAMAGE PRINT IN A VEHICLE

(71) Applicant: Click-Ins, LTD., Netanya (IL)

(72) Inventors: Dmitry Geyzersky, Netanya (IL); Evgeney Medvedev, Haifa (IL); Evgene Greenberg, Netanya (IL)

(73) Assignee: Click-Ins, LTD., Netanya (IL)

( * ) Notice: Subject to any disclaimer, the term of this patent is extended or adjusted under 35 U.S.C. 154(b) by 308 days.

(21) Appl. No.: 17/782,018

(22) PCT Filed: Dec. 2, 2020

(86) PCT No.: PCT/US2020/062775
§ 371 (c)(1),
(2) Date: Jun. 2, 2022

(87) PCT Pub. No.: WO2021/113279
PCT Pub. Date: Jun. 10, 2021

(65) Prior Publication Data
US 2023/0012230 A1    Jan. 12, 2023

Related U.S. Application Data

(60) Provisional application No. 62/942,452, filed on Dec. 2, 2019.

(51) Int. Cl.
*G06V 20/80* (2022.01)
*G06Q 40/08* (2012.01)
(Continued)

(52) U.S. Cl.
CPC ............ *G06V 20/80* (2022.01); *G06Q 40/08* (2013.01); *G06T 7/0002* (2013.01); *G06T 7/344* (2017.01);
(Continued)

(58) Field of Classification Search
None
See application file for complete search history.

(56) References Cited

U.S. PATENT DOCUMENTS 9,442,833 B1 *   9/2016   Johansson ............... G11C 16/20
10,013,720 B1 *  7/2018   Plummer ................ G06F 30/20
(Continued)

OTHER PUBLICATIONS

Chen J, Liu D, Li S, Hu D. Registering georeferenced photos to a building information model to extract structures of interest. Advanced Engineering Informatics. Oct. 1, 2019;42:100937. (Year: 2019).*
(Continued)

*Primary Examiner* — Michelle M Entezari Hausmann
(74) *Attorney, Agent, or Firm* — Guy Levi; The IP Law Firm of Guy Levi, LLC

(57) ABSTRACT

The disclosure relates to systems, methods and computer readable media for providing network-based identification, generation and management of a unique damage (finger) print of vehicle(s) by geodetic mapping of stable key points onto a ground truth 3D model of the vehicle, and vehicle parts—identified from the raw images using supervised and unsupervised machine learning. Specifically, the disclosure relates to System and methods for the generation of unique damage print on a vehicle that is obtained from captured images of the damaged vehicle, photogrammetrically localized to a specific vehicle part, and the computer programs enabling the method, the damage print configured to be used, for example, in fraud detection in insurance claims.

8 Claims, 8 Drawing Sheets

(51) Int. Cl.
*G06T 7/00* (2017.01)
*G06T 7/33* (2017.01)
*G06T 7/73* (2017.01)
*G06V 10/75* (2022.01)
*G06V 20/00* (2022.01)
*G06V 20/60* (2022.01)

(52) U.S. Cl.
CPC .............. *G06T 7/75* (2017.01); *G06V 10/751* (2022.01); *G06V 20/60* (2022.01); *G06V 20/95* (2022.01); *G06V 2201/08* (2022.01)

(56) References Cited

U.S. PATENT DOCUMENTS

| | | | | |
|---|---|---|---|---|
| 10,186,049 | B1* | 1/2019 | Boardman | G06T 7/55 |
| 10,235,762 | B1* | 3/2019 | Wylie | G06V 20/52 |
| 11,004,259 | B2* | 5/2021 | Hu | G06T 17/20 |
| 2006/0118738 | A1* | 6/2006 | Ross | G06V 10/143 |
| | | | | 250/556 |
| 2009/0265193 | A1* | 10/2009 | Collins | G06Q 30/0185 |
| | | | | 901/46 |
| 2011/0218825 | A1 | 9/2011 | Hertenstein | |
| 2013/0251265 | A1* | 9/2013 | Chehaiber | G06V 10/94 |
| | | | | 382/190 |
| 2014/0254942 | A1* | 9/2014 | Liu | G06V 10/462 |
| | | | | 382/209 |
| 2014/0314322 | A1* | 10/2014 | Snavely | G06T 7/74 |
| | | | | 382/190 |
| 2016/0012594 | A1* | 1/2016 | Romanik | G06V 10/757 |
| | | | | 382/203 |
| 2017/0046788 | A1 | 2/2017 | Macciola et al. | |
| 2017/0124784 | A1* | 5/2017 | Wittmann | G06V 30/224 |
| 2017/0138733 | A1* | 5/2017 | Michiels | B64D 47/08 |
| 2017/0148102 | A1 | 5/2017 | Franke et al. | |
| 2017/0293894 | A1 | 10/2017 | Taliwal et al. | |
| 2018/0182039 | A1 | 6/2018 | Wang et al. | |
| 2018/0240194 | A1 | 8/2018 | Dong et al. | |
| 2018/0260793 | A1* | 9/2018 | Li | G06Q 40/08 |
| 2019/0213689 | A1 | 7/2019 | Zhang et al. | |
| 2020/0111203 | A1* | 4/2020 | Tan | G06V 10/806 |
| 2021/0197625 | A1* | 7/2021 | Laperle | G06T 7/001 |

OTHER PUBLICATIONS

Forlin, Paolo, Riccardo Valente, and Miklós Kázmér. "Assessing earthquake effects on archaeological sites using photogrammetry and 3D model analysis." Digital Applications in Archaeology and Cultural Heritage 9 (2018): e00073. (Year: 2018).*

Hartmann, Wilfried, Michal Havlena, and Konrad Schindler. "Towards complete, geo-referenced 3d models from crowd-sourced amateur images." ISPRS Annals of the Photogrammetry, Remote Sensing and Spatial Information Sciences 3 (2016): 51-58. (Year: 2016).*

Guo, Yulan, et al. "A parts-based method for articulated target recognition in laser radar data." Optik-International Journal for Light and Electron Optics 124.17 (2013): 2727-2733. (Year: 2013).*

* cited by examiner

SYSTEMS, METHODS AND PROGRAMS FOR GENERATING DAMAGE PRINT IN A VEHICLE

CROSS REFERENCE TO RELATED APPLICATIONS

This patent application is a U.S. National Phase filing of commonly owned and pending PCT Application No. PCT/US20/62775, filed Dec. 2, 2020 which is based on and claims the benefit of the filing date of now expired U.S. Provisional Patent Application Ser. No. 62/942,452, filed Dec. 2, 2019, both which are incorporated herein by reference in their entirely.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. ©2019, Click-Ins, LTD.

BACKGROUND

The disclosure is directed to systems, methods and computer readable media for providing network-based identification, generation and management of damage print of vehicle. Specifically, the disclosure is directed to system and methods for the generation of unique damage print on a vehicle that is photogrammetrically localized to a specific vehicle part, and the computer programs enabling the method.

Insurance claims' management typically involves manual input and analysis by assigned professionals. One portion of claims processing that can take a great deal of time and resources is the process of having a claims adjuster visit the insured property to assess damage. Although an insurance company can be diligent and send an adjuster or other damage assessment specialist out relatively quickly, the adjuster will need some amount of time to schedule the visit and to get to the appropriate location at the time of the scheduled visit. The adjuster requires a fixed amount of overhead (vehicle, office, equipment) to perform their tasks. The travel time of the adjuster is not useful to the insurance company nor the insured, and may be a limiting factor in processing a large number of claims. There may also be a substantial delay between the time the adjuster views the property and the time the report is prepared and submitted to the insurer, which may be used by certain parties to perpetuate fraud on the insurance companies. In addition, certain damages to vehicle are minor to the point that sending an adjustor to such vehicle is not economic and settling the claim is better achieved if the damage is assessed and identified remotely.

Typical fraudulent car insurance claims may include repeat claims where following initial claim and adjustment, a colluding repair shop will increase the damage and bill the insurance company, with or without the vehicle-owner's knowledge, or additionally, or alternatively, not repair the damage and upon incurring additional damage, resubmit the claim including the original damage.

The following disclosure intends to address these requirements.

SUMMARY

Disclosed, in various exemplary implementations, are systems, methods and computer readable media for providing network-based identification, generation and management of damage print of vehicle. Specifically, provided herein are examples of system and methods for the generation of unique damage print on a vehicle that is photogrammetrically localized in three dimensional coordinate system to a specific vehicle part (in other words, including the depth of the damage), and the computer programs enabling the generation of such unique damage "fingerprint".

In an exemplary implementation, provided herein is a computerized networked method of generating a damage print on a vehicle, implementable in a system comprising: a backend management server (BMS), a user access terminal; a vehicle; a vehicle database; and a damage print database, wherein the BMS further comprises a network communication module configured to communicate with the communication network, and a central processing module (CPM), in communication with the communication module, the vehicle database and the damage print database, the CPM further comprises at least one processor in communication with a non-volatile memory storage device, storing thereon a processor readable media with a set of executable instructions, configured, when executed to cause the at least one processor to: receive images, and generate the damage print, the method comprising: receiving at least one image associated with the vehicle damage from the user; using the at least one image, identifying the vehicle; identifying at least one damages part in the vehicle; georeferencing the damage on the identified damaged vehicle part; registering the georeferenced damage to a 3D model of the identified vehicle; and generating a unique damage print.

In another exemplary implementation, provided herein is a computerized networked system for providing fraud alarm comprising: a user access terminal; a vehicle; a vehicle database; a damage print database; and a backend management server (BMS), comprising a network communication module configured to communicate with the communication network, and a central processing module (CPM), in communication with the communication module, the vehicle database and the damage print database, the CPM further comprises at least one processor in communication with a non-volatile memory storage device, storing thereon a processor readable media with a set of executable instructions, configured, when executed to cause the at least one processor to: receive a plurality of images, each image associated with the vehicle damage from the user taken at a different distance and angle relative to the damage; using the at least one image, identify the vehicle; Identify at least one damages part in the vehicle; georeference the damage on the identified damaged vehicle part; register the georeferenced damage to a 3D model of the identified vehicle; and generate a unique damage print.

In yet another exemplary implementation, provided herein is a computer-readable media having thereon a set of executable instructions, configured, when executed to cause the at least one processor to: receive a plurality of images, each image associated with the vehicle damage from the user taken at a different distance and angle relative to the damage; using the at least one image, identify the vehicle; Identify at least one damages part in the vehicle; georeference the damage on the identified damaged vehicle part; register the georeferenced damage to a 3D model of the identified vehicle; and generate a unique damage print.

These and other features of the systems and methods for the generation of unique damage print on a vehicle that is photogrammetrically localized to a specific vehicle part, and the computer programs enabling the method, will become apparent from the following detailed description when read in conjunction with the figures and examples, which are exemplary, not limiting.

BRIEF DESCRIPTION OF THE FIGURES

For a better understanding of the systems and methods for the generation of unique damage print on a vehicle that is photogrammetrically localized to a specific vehicle part, and the computer programs enabling the method, reference is made to the accompanying examples and figures, in which.

DETAILED DESCRIPTION

Figure 1:
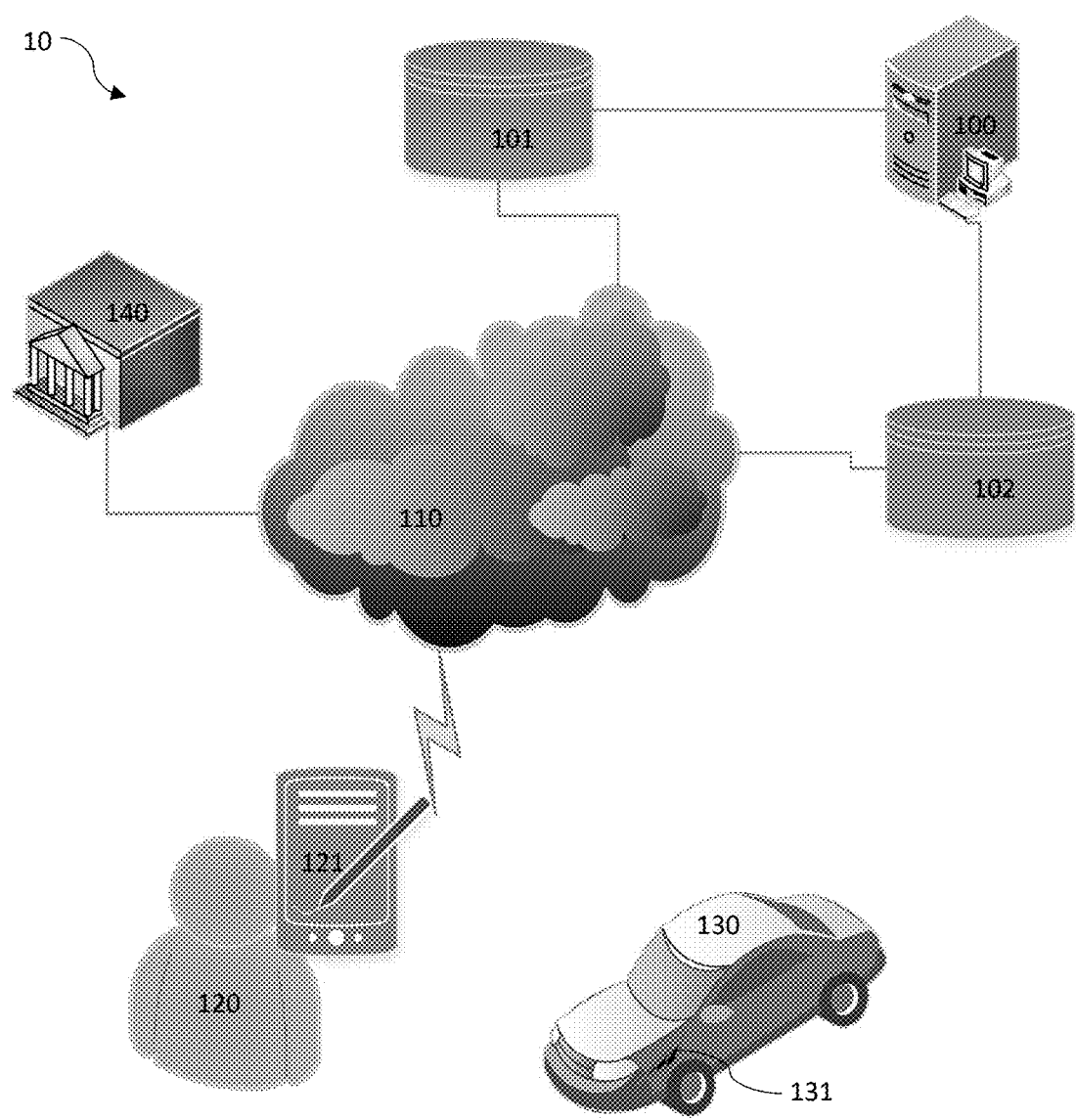
FIG. 1, illustrates the system and its components' interconnections.

Provided herein are exemplary implementations systems, methods and computer readable media for providing network-based identification, generation and management of damage print of vehicle. More particularly, provided herein are examples of systems and methods for the generation of unique damage print on a vehicle that is photogrammetrically localized to a specific vehicle part, and the computer programs enabling these methods.

Therefore, provided herein is a computerized, networked method of generating a damage print on a vehicle, implementable in a system comprising: a backend management server (BMS), a user access terminal; a vehicle; a vehicle database; and a damage print database, wherein the BMS further comprises a network communication module configured to communicate with the communication network, and a central processing module (CPM), in communication with the communication module, the vehicle database and the damage print database, the CPM further comprises at least one processor in communication with a non-volatile memory storage device, storing thereon a processor readable media with a set of executable instructions, configured, when executed to cause the at least one processor to: receive images, and generate the damage print, the method comprising: receiving at least one image associated with the vehicle damage from the user; using the at least one image, identifying the vehicle; identifying at least one damages part in the vehicle; georeferencing the damage on the identified damaged vehicle part; registering the georeferenced damage to a 3D model of the identified vehicle; and generating a unique damage print In the context of the disclosure, the term "damage print" and its derivative such as "unique damage fingerprint" of the damaged part, refers to a combination of salient, scale invariant and stable key points (dots) extracted from the captured image(s) of the damage, and their georeferenced 3D coordinates, registered onto identified vehicle part. In certain implementations, the damage print does not need to be the combination of salient, scale invariant and stable key points (dots) extracted from the captured image(s) of the damage, and can be produced using other convolutional neural networks operable to provide a unique signature of the affected area, for example, by signal processing, Siamese Networks and the like.

Furthermore, the term "georeferenced" and its derivatives, for example, "georeferenced 3D coordinates" refer to georeferenced information relating image data to a known location relative to an identified part of the vehicle. In certain exemplary implementations, the stable key points extracted from the two-dimensional image(s) captured by the user can be unprojected onto the datum (the reference systems that describe the size and shape of the vehicle), which can be the vehicle identified initially by the system and methods disclosed. For example, the datum can be parsed to provide the exact coordinates (in 3D) of the front right quarter panel of a vehicle which dimensions are obtained from a canonical 3D model rendering of the vehicle's model, trim (option package), color and year identified by the disclosed methods and systems.

Furthermore, the term "canonical model" and its derivatives, in the context of the disclosure, refer to the official 3D model rendering of the vehicle, specific to the vehicle model, trim, year and color. 3D car models rendering can come with different file formats, such as the 3D Studio (0.3ds) file format, Wavefront OBJ format and the LightWave object (.lwo) file format. Typically, the car 3D model can be represented by a parallelepiped comprising finite components which, by parameterization, are transformed into curves, contour lines and surfaces obtained by moving the generators according to certain predetermined principles. The 3D car model file representing the various parts, can be, for example: an ODB, an ODB++, an.asm, an STL, an IGES, a STEP, a Catia, a SolidWorks, a Autocad, a ProE, a 3D Studio (3ds), a Gerber, a Rhino, an Altium, an Orcad, an or a file comprising one or more of the foregoing.

Figure 8A:
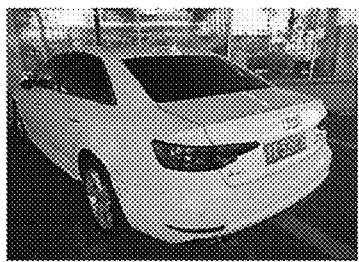
FIGS. 8A-8F, are images and their processing for the generation of training set for part and vehicle identification.
Figure 8B:
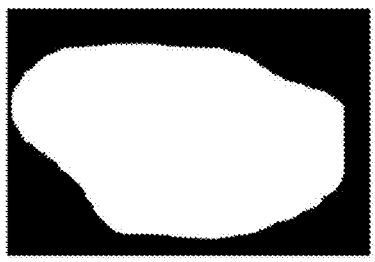
Figure 8C:
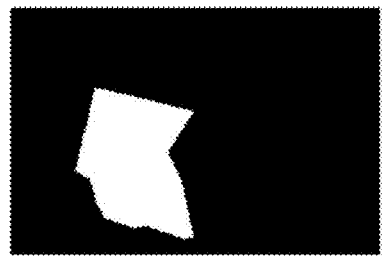

The image(s) captured by the user 120 (see e.g., FIG. 1), using for example a smartphone, or another imaging module, is analyzed further to extract and identify at least one of: the make, model, trim, year and principal color. To detect the vehicle(s), the image can be segmented to separate the vehicles from the background (see e.g., FIG. 8B), such that the vehicles are separated from the background accurately, be insensitive to lighting and weather conditions, and require a minimal amount of pre-processing of the image. These isolation methods can be, for example, segmentation algorithms based on convolutional neural networks (CNN) such as Faster R-CNN and FCN (Fully Connected Network). Auto encoders and decoders can also be used in other implementations for fine tuning the results of instance segmentation. In other words, the background is not subtracted, but rather to all the instances of objects of interest are subtracted from the background.

In the context of the disclosure, a Kalman filter means an algorithm stored in BMS that is used to estimate a set of parameters that may be used to determine the position of the vehicle relative to the background at any given time. The estimated parameters are then stored in a non-volatile memory device included with the BMS. The theory and operation of Kalman filters has been widely discussed in the technical literature, for example, in Kalman, R. E., "A New Approach to Linear Filtering and Prediction Problems," Transactions of the ASME, Journal of Basic Engineering, Series 82D, pp. 35-45, March 1960; Kalman et al., "New Results in Linear Filtering and Prediction Theory," Transactions of the ASME, Journal of Basic Engineering, Series 83D, pp. 95-108, March 1961; Mendel, J. M., "Bibliography on the Linear-Quadratic-Gaussian Problem," IEEE Transactions on Automatic Control, vol. AC-16, no. 6, December 1971; Sorenson, H. W., ed., Kahnan Filtering: Theory and Applications, IEEE Press, New York, 1985; and Sorenson, H. W., "Kalman Filtering Techniques," from Advances in Control Systems Theory and Applications, vol. 3, C. T. Leondes, ed., pp. 219-292, Academic Press, Inc., 1966.

In other words, before analysis of the image is commenced, the systems, methods and programs disclosed identify whether the image contains a vehicle in the first place, and if so, whether the vehicle is the only object in the image. Identifying the presence of the vehicle and its isolation from other vehicles or objects potentially captured, can be done for example, by machine learning, where using both synthetic and native images, features such as edges and contour lines are identified on the captured 2D image and create a mask (see e.g., FIG. 8B). Forming the vehicle image mask can be generated for example, through the use of median filters, which, for example replaces the gray value of a pixel by the median of the gray values of its neighbors, potentially preceded or followed by enhancing the contrast in the image through histogram equalization techniques or other edge detection methods (e.g., Sobel, Canny, Prewitt, Roberts, or fuzzy logic). Machine learning can be both supervised and unsupervised and in an example, the training dataset is entirely synthetic, while validation dataset can is real (interchangeable with native) data.

Accordingly and in an exemplary implementation, the system comprises a repository or database (see e.g., database 101, FIG. 1), containing canonical 3D model rendering of the vehicle whose image is captured. Being a networked system, in an example, once the make, model, model year, trim, principal color and their combination is determined, the canonical (in other words, the car maker's official) 3D rendered file can be uploaded to the database and used. The synthetic dataset is used in an exemplary implementation, to train the system to identify the damage and/or the vehicle part damaged, while the native (or real) images, can be further annotated (in other words, labeled) and used to identify the specific parts on the identified vehicle where the damage is localized. Furthermore, because the system is trained to detect specific vehicle parts, any bounding box rendering will be limited (in other words, the box will take on the corresponding shape) to a given vehicle part regardless of whether the damage extends across the boundary (or contour line delineating adjacent parts) between the vehicle parts. It is noted, that the methods disclosed herein, implemented with the systems provided, while using 3D model file rendering of the vehicles as ground truth (i.e., canonical models) for the detection of damage, do not rely on reflection detection from mostly Class-A surfaces, since recently matted surfaces and other textured surfaces have come to the market, makes reliance on reflection detection somewhat challenging.

It is also noted, that although the systems, methods and programs disclosed herein can generate the unique damage print with a single image, in certain circumstances it would be beneficial to have a plurality of images taken at different resolutions (in other words, distances) and angles to provide additional information, such as for example the depth of the damage in any dents with different perspective views.

Accordingly, the methods disclosed herein, implemented using the systems and programs described, further comprising receiving from the user a plurality of images, each associated with the vehicle damage. In other words, the user, using the terminal access device 121 (see e.g., FIG. 1) uploads the image(s) to the network.

The term "system" shall also be taken to include any collection of systems or sub-systems that individually or jointly execute a set, or multiple sets, of instructions to perform one or more functions. Also, the term "system" refers to a logical assembly arrangement of multiple devices, and is not restricted to an arrangement wherein all of the component devices are in the same housing.

Figure 3:
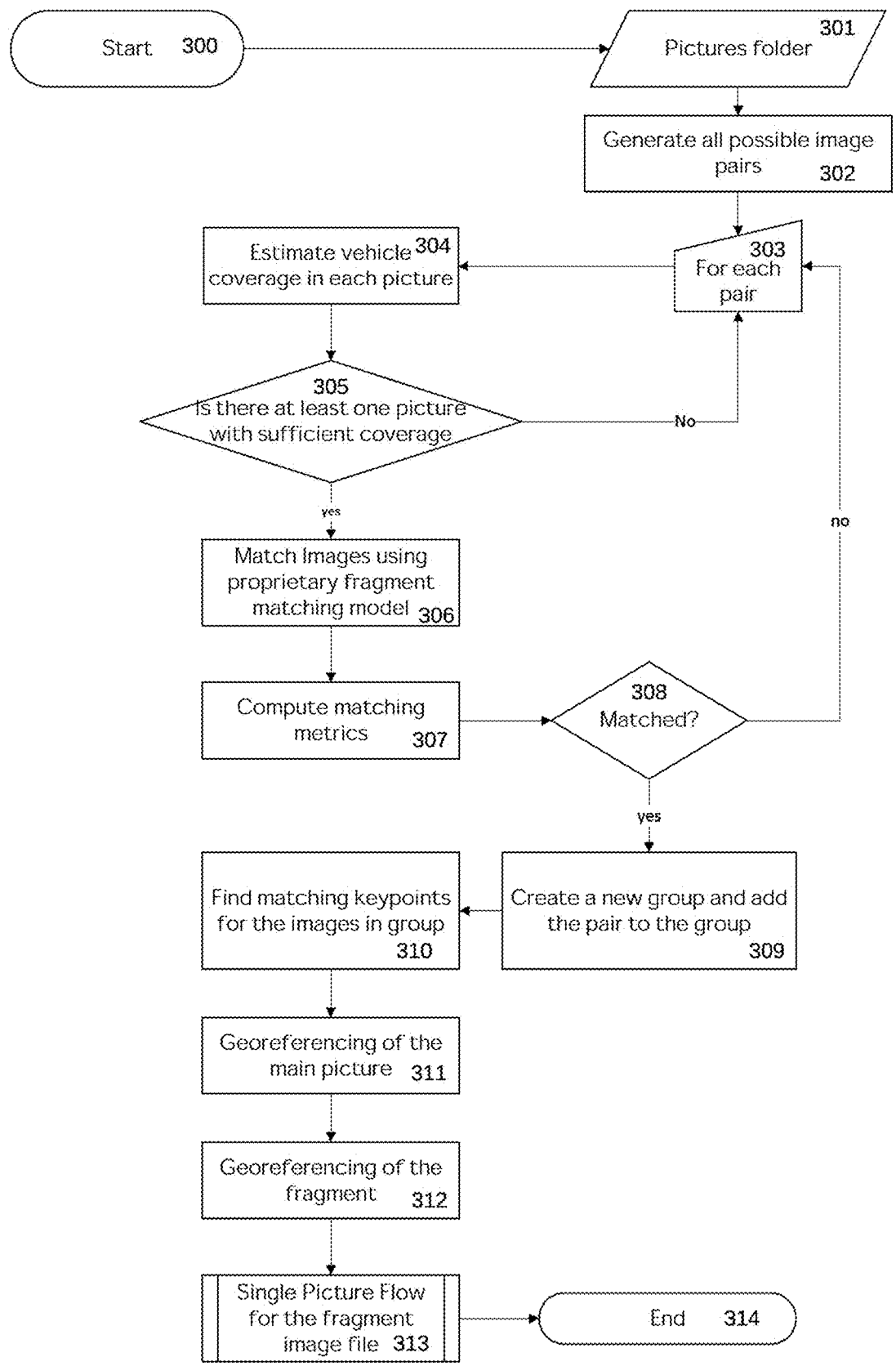
FIG. 3, is a flow chart depicting an example of the generation of the damage print using multiple images.

Accordingly and as illustrated schematically in the flow chart of FIG. 3, and FIG. 1; the step of georeferencing is preceded in an example by: from vehicle database 101, retrieving a canonical 3D model rendering of identified vehicle 130; identifying the damaged part(s) in vehicle 130 isolating the damaged part(s) from the canonical model; comparing the images to the isolated undamaged parts obtained from the canonical model; and detecting a plurality of salient key points (dots) associated with surface anomalies on the images. In the context of the disclosure, surface anomalies refers to any difference between the isolated part image obtained from the 3D model rendering, and the transformed image captured of the damaged vehicle part as pre-processed by the system prior to the anomaly detection step. The (e.g., affine, image registration) transformation configured to align the captured image regardless of the camera pose (referring to 6 degrees of freedom (DOF) associated with the relative to the vehicle part, with the imaging device's X, Y, Z coordinates in a Cartesian system, as well as its pitch roll and yaw relative to a predetermined point on the vehicle), the canonical 3D model rendering of the car and its relevant isolated part. For example, The affine transformation can be represented by 4 coefficients a, b, c, d composing the matrix A for the linear part, plus the coefficients $v_x$, $v_y$ of the translation vector $\{\vec{v}\}$:

$$A = \begin{pmatrix} a & b \\ c & d \end{pmatrix}, \vec{v} = \begin{pmatrix} v_x \\ v_y \end{pmatrix} \quad \text{(Equ. 1)}$$

where the affine transformation maps each key point in the Cartesian coordinates $(x, y)^T$ to $(x', y')^T$, of the canonical 3D part model according to the formula:

$$\begin{pmatrix} x' \\ y' \end{pmatrix} = A \cdot \begin{pmatrix} x \\ y \end{pmatrix} + \vec{v} \quad \text{(Equ. 2)}$$

where "·" is the matrix product, and "+" the vector sum, wherein, as in here, translations can be independently determined, for example based on cross-correlation with fiducial markers annotated in the 3D canonical model, representing the known edges of the vehicle part.

Various affine transforms can be used on the captured images uploaded to the system 10. These can be, for example:

a change of aspect-ratio of factors $s_x$, $s_y$, which is equivalent to different rescalings along the x- and/or the y-axis (of the captured image), represented by the formula:

$$S = \begin{pmatrix} s_x & 0 \\ 0 & s_y \end{pmatrix} \quad \text{(Equ. 3)}$$

and/or
a rotation of angle θ represented by the formula:

$$R = \begin{pmatrix} \cos\theta & \sin\theta \\ -\sin\theta & \cos\theta \end{pmatrix} \quad \text{(Equ. 4)}$$

and/or
shearing along the x- and/or the y-axis of factors $s'_x$, $s'_y$, represented by the formula:

$$S_h = \begin{pmatrix} 1 & s'_x \\ s'_y & 1 \end{pmatrix} \quad \text{(Equ. 5)}$$

A person skilled in the art would recognize that depending on whether the reference being used for mapping the damage key point(s) is part edge (in other words, a contour-line), or extremity of damage, an affine transform factor can be obtained from successive combination of affine transforms $A_i$, i=1 . . . n for each key point in the image(s) associated with the damaged part (in other words, $A = A_n \cdot A_{n-1} \cdot \ldots A_1$), and can be recovered by using, for example at least one of: a transform invariant domain, an additional calibration template/pattern, and exploiting the self-reference principle based on an auto-correlation function (ACF), or forward/backward mapping, causing the affine transform to be self-improving from one iteration to the next.

Figure 4:
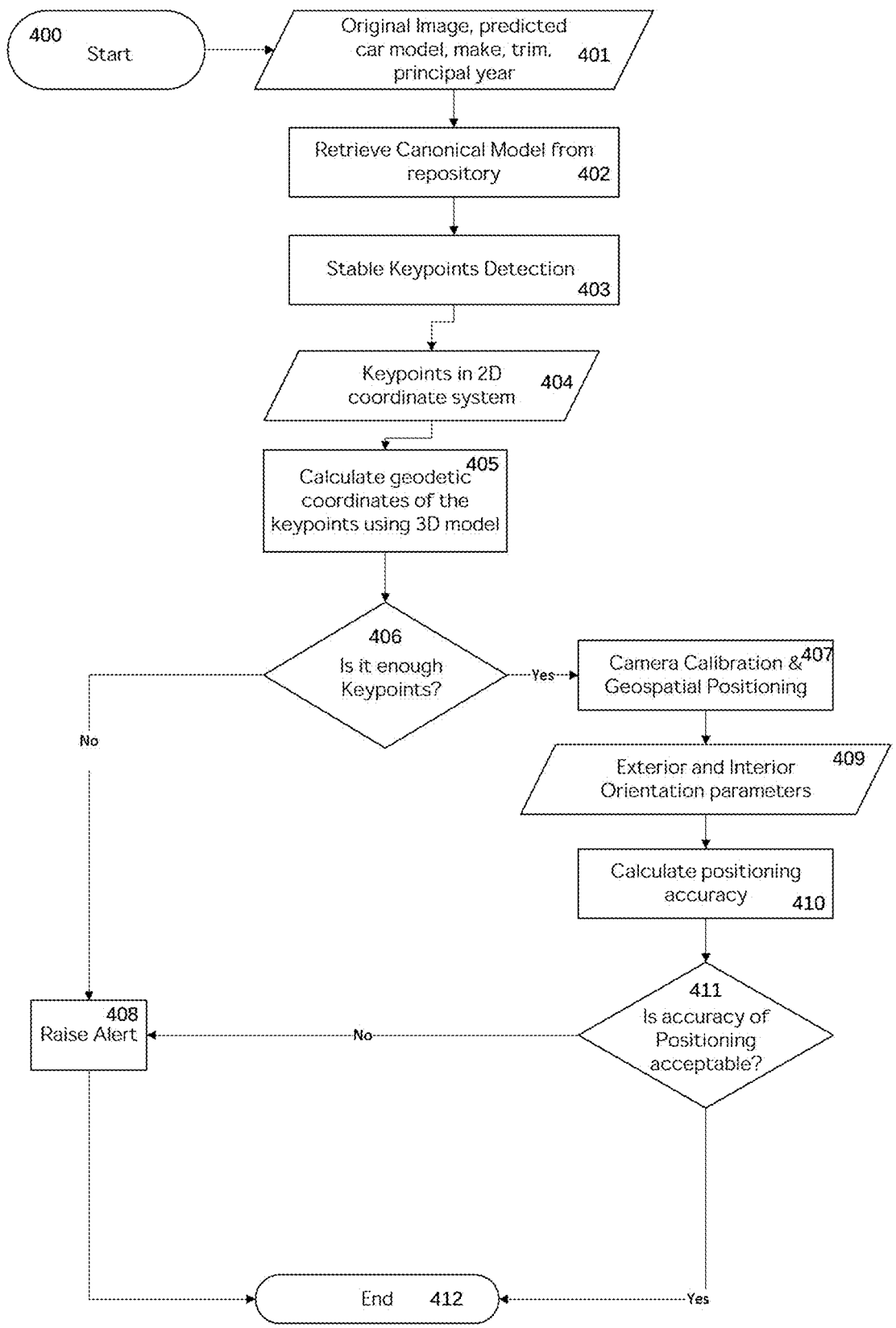
FIGS. 4 and 5, are flow charts illustrating an example of the process of georeferencing the damage print onto the identified part, for the main image and a fragment thereof respectively.

In an exemplary implementation, the step of georeferencing the damage on the identified damaged vehicle part, in the methods disclosed, implemented using the systems and programs described is described schematically in FIG. 4 and can comprise: following identifying the make, model, trim, and color 401 in the original image(s), extracting a plurality of stable key points (dots) of the anomalies on the at least one image; referencing each stable key point on a two-dimensional (2D) coordinate system (of the transformed image e.g.,); using the canonical 3D model rendering, calculating the geodetic coordinates of each stable key point onto the 3D model rendering; and geospatially positioning each stable key point onto the at least one damaged part.

For example, extracting the plurality of stable key points of the anomalies on the raw, native image(s) for example, the main and/or fragment images, comprises: extracting a scale invariant feature transform (SIFT) feature of the at least one image. This can be done by using the canonical (or ground truth 3D model identified using machine learning, yielding MMYTC); and using difference of Gaussian (DoG) (or the Laplacian of Gaussian) for scale-space extrema detection (e.g., parameterized by the size of the smoothing kernel used for suppressing fine-scale structures) over at least two scales (in other words, using images taken in different distance to the part or the vehicle), extracting the plurality of stable key points, thereby obtaining the convolution matrix (kernel) of the original image. The stability of the key points can be ascertained applying a reiterative model that will fit the key-points location and scale, and once identified the best orientation for each key-point on the canonical model is computed. Then, a key point descriptor, consisting for example of an image gradient at the given scale and rotation is used to describe each key-point region.

This process is used in certain configurations, to match, or accurately register the canonical 3D rendering to the 2D native image. In other words, the salient key points, or dots, which are not necessarily associated with the damaged part, once extracted by the system and program disclosed, are used to impose the 3D canonical model, onto the 2D native image.

The methods implemented using the systems and programs described, can be used for various purposes, for example, to prevent insurance fraud. Accordingly, the methods provided herein further comprise comparing the generated unique damage print to damage prints stored on damage print database 101; and if the damage print generated using the method and claimed matches a unique damage print stored on the damage print database, generating a fraud alarm; else storing the generated unique damage print in the damage prints database. It is noted that the match does not need to be identical, or in other words, 100% match, but can be between about 75% and about 99%, or between about 75% and about 95%, for example, between about 80% and about 90%, or between about 81% and about 89%. Furthermore, the determination of the type of alarm generated by the system can be a function of the degree of matching between the stored damage print and the generated damage print. The alarm generated can be an email sent to a third party by backend management server 100, for example to third party 140, which can be at least one of: a governmental agency, an insurance company, a bank, and the user.

When the user uploads a plurality of images, or, for that matter, a video stream, the method further comprises generating a plurality of image pairs from either the frames or the captured images. The image pairs are segmented as described herein to isolate the vehicle from its background and/or (damaged) vehicle part from the background once the system determines that indeed a vehicle does appear in the captured image or clip (short video stream), followed by the identification of both the vehicle itself (make, physical model, year, trim and principal color, or MMYPC), and the affected part(s). If the user uploads a clip of the vehicle, optical flow analysis can be performed by the system, to generate the frame (image) pairs. Based on the analysis of the optical flow (the pattern of apparent motion of objects), the selected frames can be those providing different resolution (distance and/or perspective views from the vehicle and affected damaged area), and angle relative to the damaged area, as well as optimize for lighting and other parameters, such as weather conditions, glare and the like. Similar analysis is carried out in pairing individual (still) images captured and uploaded by the user.

Figure 8D:
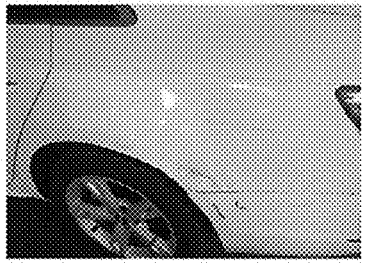
Figure 8E:
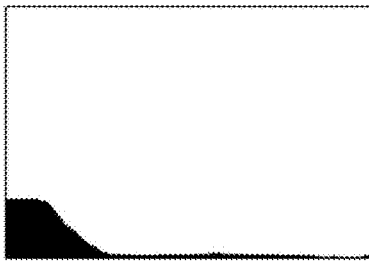
Figure 8F:
Figure 9A:
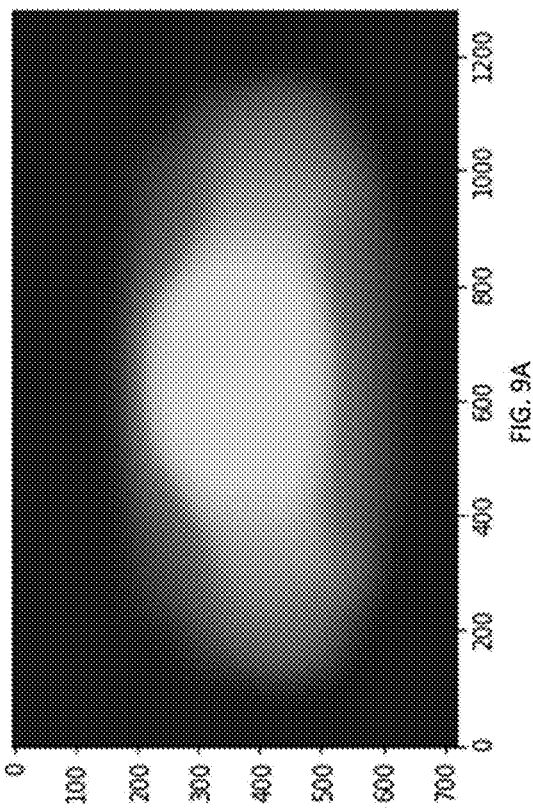
FIGS. 9A and 9B are heat maps of the fragment and its correspondence on the full frame view images processed in FIGS. 4, and 5.
Figure 9B:
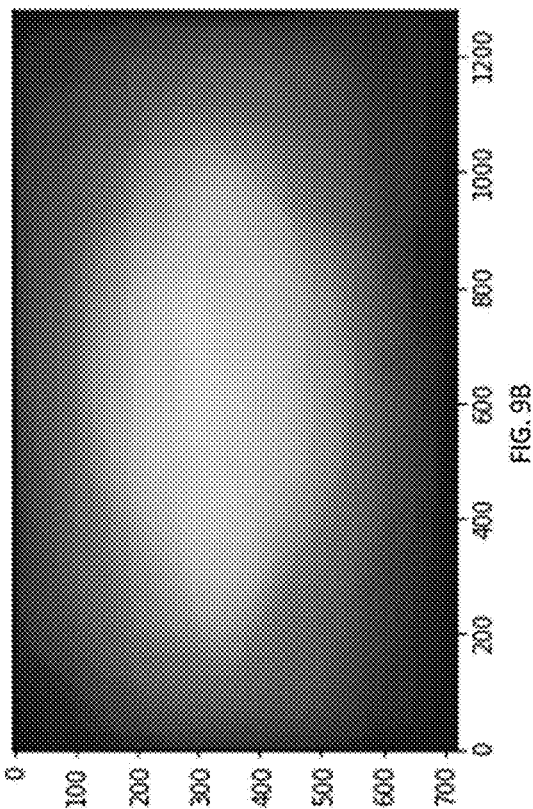
Figure 9C:
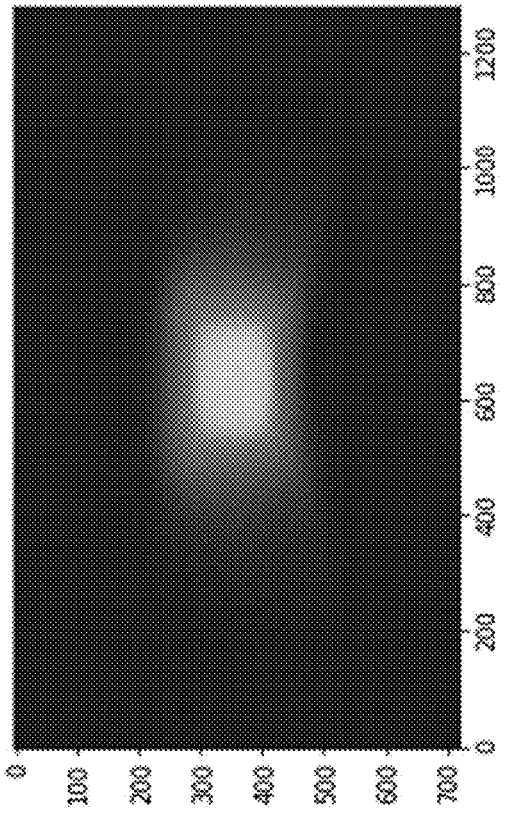
Figure 9D:
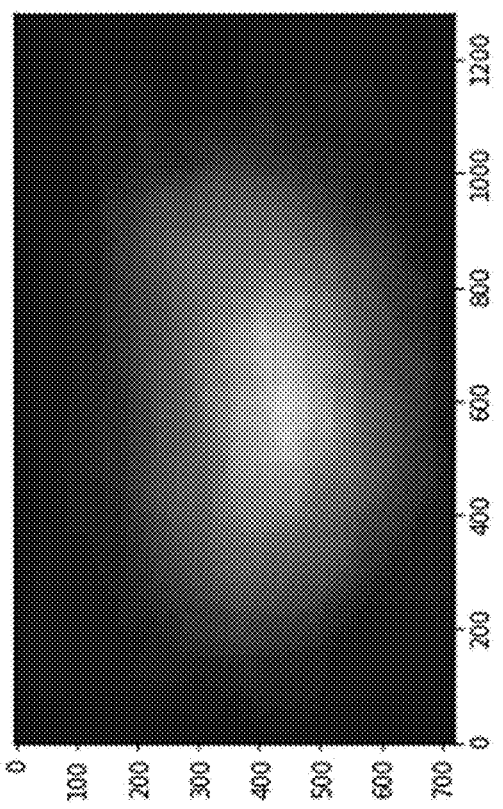

For each image pair, the method further comprises the step of estimating the area of vehicle covered in each image in the pair. In an example, a first image can capture the whole vehicle (see e.g., FIG. 8A), while the second image in the pair can capture a fragment of the vehicle, for example, only the damaged area (see e.g., FIG. 8D), then, using fragment matching (in other words, finding near-duplicate images, with or without using affine transforms on one or both images), matching a first image to the second image in the pair for all image pairs determined to have at least one image in the image pair, that has sufficient vehicle area coverage. It is noted, that here, there is a-priory information on the content of the images (vehicle parts from an identified vehicle), making the matching of fragments and, if necessary the affine transforms (e.g., at least on of: translation, rotation, and shear), more accurate. Moreover, since the content is known, in an example, the programs are further configured to perform (and the method to take the step of)

pre-retrieval of common elements (such as the salient, stable points extracted initially) from each image, thereby reducing the time for pairing the images and alleviating the computational burden on the system. To match the image pairs, various methods can be used, for example, topological orientation of identified stable key points and their relative location on Cartesian/geodetic coordinates, whereby for each pair of matched key points, the largest subset of orientation-ordered neighbors is found, forming the paired image.

Each image pair is made of two images: a whole car image and car part image. To be paired, the two images must be from the same make, physical model, year, trim, and principal color (MMYTC), similar lighting conditions, and the like parameters. Mask (vehicle isolated from its background, ee e.g., FIG. 8B) pair is matching (overlapping) between two images when, for example, visible car surface from part image (fragment, e.g.,) is identified and located on the full car image (main). In an exemplary implementation, vehicle masks are also added as well, and placed in a separate folder. Image size resolution, in pixels shouldn't typically be less than 720×540, for example 1280×720 or 1980×1080 and include possible shadows, reflections, background, etc. The image that has sufficient vehicle area coverage (in other words, coverage that allows the identification of the MMYTC, is defined in an exemplary implementation as the "main" pair's image and the second image in the pair is a "fragment" image. The coverage area in the main image does not necessarily needs to be larger and may be of similar coverage area, but which provides, for example, better lighting, captures an identifying feature (e.g., logo, trim designator, stable key point, etc.), detailed damage area, and the like.

Figure 7:
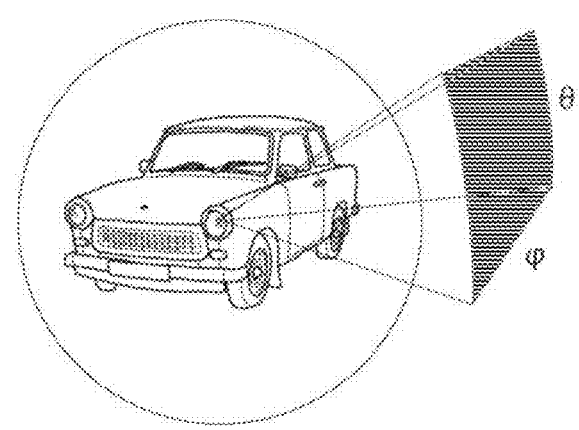
FIG. 7, illustrates the overlapping of the images captured from the vehicle.

In general, the captured image pair can be, for example, full vehicle image(s) (main images), which are captured from a height points of 1-1.8 meters, while part (fragment) image(s), can be captured from a height of between about 0.2 m and about 1.5 m. Vehicle fragment image(s) are typically taken for example, from various angles relative to the vehicle. Moreover, distance from the vehicle should be enough to see the whole vehicle for full vehicle image(s) (or large portion thereof, e.g., >75% of the vehicle) and for fragment image(s) be from 3-8 times smaller. Camera (or any other imaging device) angles are typically different between main vehicle image(s) and fragment image(s) in, for example, the "left-to-right" direction, corresponding to angle $\varphi$ (see e.g., FIG. 7) and can be in range from −100 to 100 degrees. Additionally or alternatively, the relationship between the main and fragment images can be "up-to-down" direction corresponding to angle $\theta$ in range from −45 to 45 degrees (in other words, different X, Y, Z coordinates and different pitch, roll and yaw of the image capturing device, whether in stills or by varying video capture points). Position of main vehicle image(s) has for example, Gaussian 2D distribution. Identified vehicle in the main vehicle image(s) doesn't have to be in the center of image, and whole vehicle doesn't have to be fully visible (some minor parts of the vehicle can be missing, or obscured). The position of vehicle fragment image(s) also has Gaussian 2D distribution in another example. Moreover, the vehicle fragment is not necessarily in the center of the image. It is noted, that the number of main images and fragment images does not have to be the same, and one main image(s) can be paired with a plurality of fragment images. This can occur, for example, when the damage bridges two or more car parts and each fragment is on a different part, while the main image(s) is of all parts.

The pairs are then grouped, creating a matched pairs group then adding the matched image pairs (main/fragment) to the matched pairs group, followed by georeferencing the main image in the matched image pair, for each image pairs in the matched pairs group and separately georeferencing the fragment image in the matched image(s) pair, for each image(s) pairs in the matched pairs group. As indicated (and with the flowchart illustrated in FIGS. 4, and 5), the step of georeferencing the main image(s) in the matched image(s) pair, and each fragment image(s) in the matched image(s) pair is preceded by: from a vehicle database, retrieving a canonical 3D model rendering of the identified vehicle; isolating the undamaged parts from the canonical model; comparing the images (ostensibly depicting the damaged parts) to the isolated undamaged parts obtained from the canonical model; and detecting a plurality of stable key points associated with surface anomalies on the images.

Then, georeferencing, each of the main image, and each fragment image in the matched image pair, comprises extracting a plurality of stable key points of the anomalies on the at least one image; referencing each stable key point on a two-dimensional (2D) coordinate system in the image; using the canonical 3D model rendering (in other words, the "geodetic reference datum"), calculating geodetic coordinates of each stable key point (e.g., longitude, latitude, elevation etc.); and geospatially positioning each stable key point onto the at least one damaged part. In other words, locating the stable key points on the corresponding part of 3D canonical vehicle model of the whole car. Assuming the whole vehicle is the geodetic reference datum for the geospatial positioning, the whole vehicle is positioned in Cartesian coordinates, and the stable key points are then given their proper coordinates in that Cartesian framework. Thus, the damage print becomes the identified stable key-points' 3D coordinates of the whole vehicle. Once the group of stable key points are unprojected (in other words, georeferenced), from the 2D main image. and/or fragment image (for example, computed by a multiplication of the pixel addresses in the 2D image, with the pixel size and a shift to a principal point), onto the canonical 3D model rendering of the whole car, the damage print is then registered onto the 3D model and stored in the damage print database 102. Other parameters can for a part of the damage print, for example, distance between stable key points in the damaged area, their spatial arrangement relative to each other and the like.

Thus, and in an exemplary implementation, the methods disclosed herein, implemented using the systems and programs (computer/processor readable media e.g.,), the georeferenced damage is registered to the canonical 3D model rendering of the identified vehicle. In this step, the photogrammetric product (e.g., the georeferenced stable key points) are reconstructed using the geometric relations of imaging in the retrieved 3D vehicle canonical model's coordinate system.

Accordingly, for each image captured, using the canonical 3D-identified vehicle model, at least one of exterior orientation parameter, and at least one interior orientation parameter of the at least one damaged part's image is obtained. The interior orientation parameter can be, for example, the 3D coordinates of the projection of the center of the vehicle. Other internal orientation parameters can be, for example, at least one of: the calibration certificates of the camera used in the user access terminal, including the location of the principal point, the focal length, and the radial symmetric lens distortion. On the other hand, external orientation parameters describe the location and orientation of the stable key points in the 3D vehicle canonical model's coordinate system with 6 parameters (6DOF): projection center coordinates ($X_0$, $Y_0$, $Z_0$—obtained from the internal orientation parameters), and the rotations' angular values around the 3 axis (pitch, roll and yaw [$\Omega$, $\Phi$, and K respectively]).

Thereafter, using the at least one of exterior orientation parameter, and at least one interior orientation parameter, performing ortho-rectification of the key points, followed by detecting and positioning the plurality of the stable key points in the orthophoto coordinate system and using the canonical 3D model rendering, calculating geodetic coordinates of each stable key point. Then each stable key point is geospatially positioned onto the at least one damaged part isolated from the canonical 3D vehicle model, corresponding to the identified damaged part.

Accordingly, the orthorectification is followed by coregistration of the stable key points of the damage onto the now-damage-updated 3D vehicle model (not canonical model anymore). The orthorectification and co-registration can be performed, for example, using direct orthorectification model, which computes the geodetic location of the key points on the canonical 3D model rendering, where each pixel in the main/fragment image(s), i.e., the focal plane of the instrument, has to be projected onto. Another orthorectification that can be used is phase-correlation method, relying on Fourier shift theorem, whereby relative displacement between the raw main/fragment image(s) and the canonical 3D model rendering is retrieved from the phase difference of their Fourier transform. The images' relative displacement can then alternatively be estimated from the coordinates of the correlation peak.

In an exemplary implementation, a list of damaged part is generated and stored in the damage print database 102, so long as the damage identified and mapped to the 3D vehicle mode cannot be retrieved from the same database 102.

In an exemplary implementation, the methods disclosed herein are implemented using the systems and executable instructions describe. Accordingly and in another exemplary implementation, provided herein is a computerized networked system for providing fraud alarm comprising: a user access terminal; a vehicle; a vehicle database; a damage print database; and a backend management server (BMS), comprising a network communication module configured to communicate with the communication network, and a central processing module (CPM), in communication with the communication module, the vehicle database and the damage print database, the CPM further comprises at least one processor in communication with a non-volatile memory storage device, storing thereon a processor readable media with a set of executable instructions, configured, when executed to cause the at least one processor to: receive a plurality of images, each image associated with the vehicle damage from the user taken at a different distance and angle relative to the damage; using the at least one image, identify the vehicle; Identify at least one damages part in the vehicle; georeference the damage on the identified damaged vehicle part; register the georeferenced damage to a 3D model of the identified vehicle; and generate a unique damage print.

The user access terminal can further comprise a graphic user interface and an imaging module sized adapted and configured to capture images of damaged vehicle parts. The imaging module may comprise charge coupled devices (CCDs), a complimentary metal-oxide semiconductor (CMOS) or a combination comprising one or more of the foregoing. If static images are required, the imaging module can comprise a digital frame camera, where the field of view (FOV) can be predetermined by, for example, the camera size and the distance from the card's face. The cameras used in the imaging modules of the systems, devices, method and computer programs described herein, can be a digital camera. The term "digital camera" refers in an exemplary implementation to a digital still camera, a digital video recorder that can capture a still image of an object and the like. The digital camera can comprise an image capturing unit or module, a capture controlling module, a processing unit (which can be the same or separate from the user access terminal (UAT)). The imaging module, can also be configured to transmit video feed to either the BMS. The video/stills can be transmitted using radio frequency, Bluetooth, ZigBee, or cellular networks. In an exemplary implementation, the video encoding can have a format of H.264, H.265, MPEG, and the like.

Likewise, both display module and the processor of the UAT may further comprise a user interface module, whereby, "user interface module" broadly refers to any visual, graphical, tactile, audible, sensory, or other means of providing information to and/or receiving information from the user or other entity. For example, a set of instructions which enable presenting a graphical user interface (GUI) on display module of UAT 121 (see e.g., FIG. 1) to user 120 (see e.g., FIG. 1) for displaying and changing and or inputting data associated with uploading the damage images. In an exemplary implementation, the user interface module is capable of displaying any data that it reads from imaging module. Accordingly and in an exemplary implementation, UAT 121 (see e.g., FIG. 1) comprises a display; a communication interface, adapted for two-way communication with the communication network; a user interface, adapted to provide the user input; and a processor, in communication with the display, the communication interface, and the user interface, the processor being in communication with a non-volatile storage device having thereon a processor-readable medium with an application program interface (API) configured, when executed, to cause the processor to: capture an image associated with the vehicle damage; and transmit the selected images to a backend management server.

It is noted, that the system provided herein contemplates the presence of a plurality of UATs, all accessing and being accessed simultaneously through the network. The term "network terminal" in the context of the UAT(s), refer to any device (for example, UAT 121) that is accessible via an internet protocol (IP) network, such as for example, at least one of: a server, a personal computer, and laptop or notebook, linked to the IP network via a fixed or wireless link or a PDA or a smart phone linked to the IP network via a wireless link, and the term "Network Access Terminal" refers to any device, such as for example a mobile phone, able to be connected to a Mobile Communication Network. The term (terminal), may further include some or all the functionality of, a user equipment (UE), a wireless or wired communication device, a network device, a personal communication device, mobile device, and/or a mobile station. In an exemplary implementation, the network access terminal can be a hotspot, referring to a public access venue, location and/or geographical area in which a wireless access point (WAP) provides wireless network services (e.g. 802.11a/b/g/n based or supported services, WiMax based or supported services, cellular network based or supported services such as via CDMA, HSDPA, GPRS, etc., and other such services) to mobile users through a wireless local area network (WLAN), metropolitan area network (MAN), wide area network (WAN), or the like, using, for example but not limited to, Wi-Fi technology or the like.

Also included in the system implementing the methods provided herein is a backend management server comprising a network communication module configured to communicate with the communication network, and a central processing module (CPM), in communication with the communication module, the vehicle database and the damage print database, the CPM further comprises at least one processor in communication with a non-volatile memory storage device, storing thereon a processor readable media with a set of executable instructions, configured, when executed to cause the at least one processor to: receive a plurality of images, each image associated with the vehicle damage from the user taken at a different distance and angle relative to the damage; using the at least one image, identify the vehicle; Identify at least one damages part in the vehicle; georeference the damage on the identified damaged vehicle part; register the georeferenced damage to a 3D model of the identified vehicle; and generate a unique damage print.

Moreover, the systems provided herein can be configured to use internal database(s), for example, the first non-volatile storage device in communication with the 3D model database (micro SQL), to store and/or authenticate users, 3D canonical vehicle models, payments and the like. This Data Base should be easily synched with main Networking Authentication databases/servers.

Referring to the drawings, and more particularly by reference numbers, FIG. 1 shows a system 10 comprising backend management server 100, in two-way communication with 3D canonical vehicle models database 101 and image print database 102, being in further two-way communication with communication network 110. Also illustrated is user 120 having user access terminal 121. Third party 140 is also included in system 10, and can be an insurance company, a car rental company, a governmental agency and the like third party.

Figure 2:
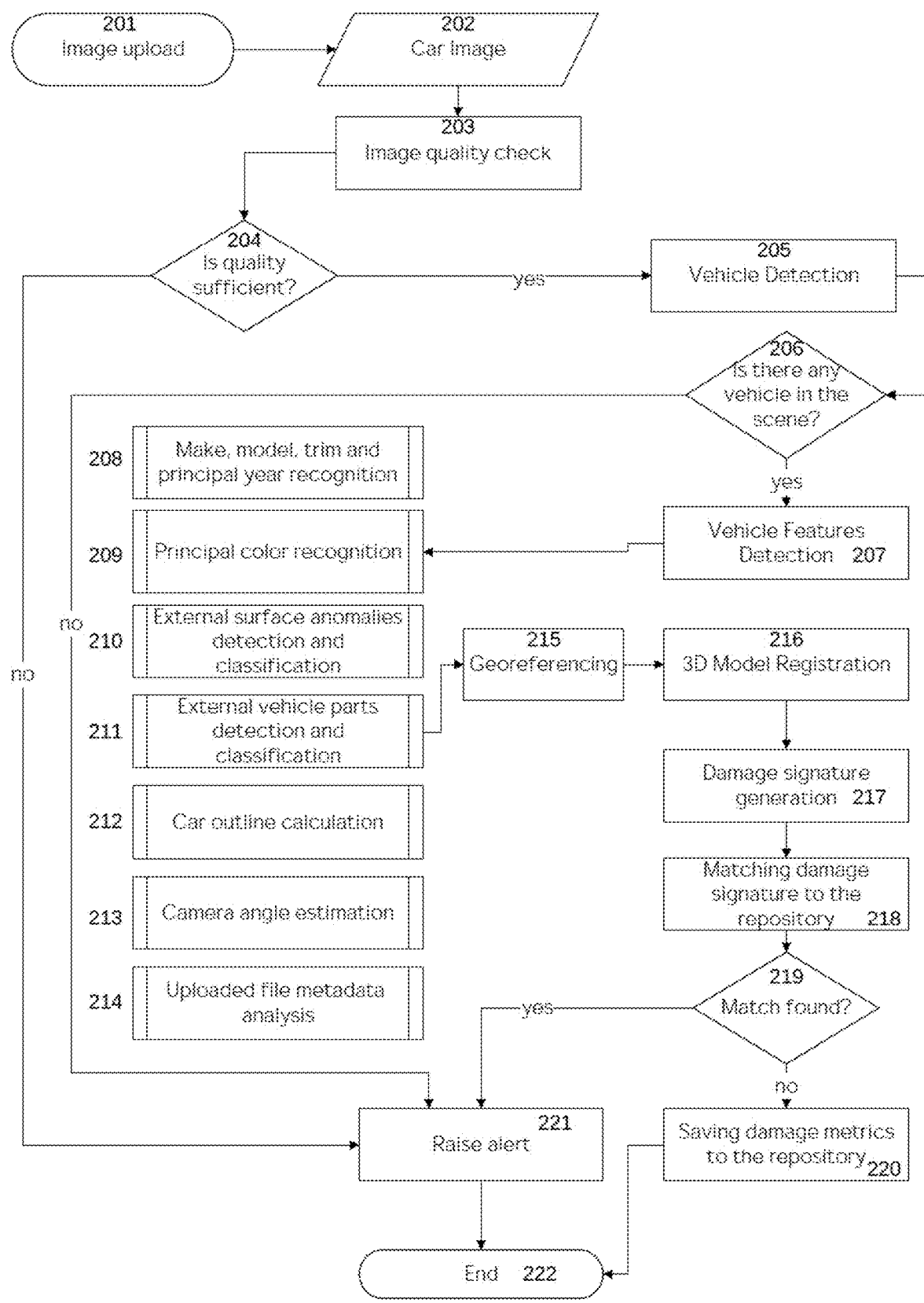
FIG. 2, is a flow chart depicting an example of the generation of the damage print when using a single image.

Turning now to FIG. 2, showing a flow chart depicting an example of the generation of the damage print when using a single image. As illustrated, following the user 120 capturing an image of the damaged vehicle and uploading 201 the image 202 to the BMS 100, where the image quality is evaluated 203. If the image quality is insufficient 204 (not high enough resolution, or not capturing enough of the vehicle to allow identification of MMTYC, the system will send an alarm 221 to the proper parties, for example user 120. If the image is of proper quality, vehicle will be detected 205, querying 206 whether there is a vehicle in the image. Determination there is no vehicle will again raise an alarm 221, and if there is a vehicle, the vehicle MMTYC 208, 209, will be carried out, external surface anomalies are detected and classified 210; external vehicle parts are detected and classified 211; the car outline is extracted from the background 212 and the camera angle (pose) is estimated 213; and uploaded file metadata is analyzed (e.g., GPS position, time of day, time, internal camera calibration parameters, etc.) 214, whereupon georeferencing 215 can take place co-registered 216 to the canonical 3D model retrieved. Then the damage print can be generated 217 and compared 218 to the damage prints repository in the damage print database 102. Querying 219 the database, if a match is found, an alarm will be raised 221, otherwise the damage print is saved 220 in the damage print database.

Turning now to FIG. 3, showing a flow chart depicting an example of the generation of the damage print using multiple images. As shown pictures captured by user 120 are uploaded to system 10 BMS 100 and filed 301 in picture folder. All possible image pairs are generated 302 as described herein and for each image pair 303, the coverage area in each image is estimated 304 and a query is made as to whether there is one image with sufficient coverage area 305. If no image is determined to have sufficient coverage area, a new image pair will be retrieved from the generated pairs 302 and analyzed. If however, at least one image is determined to have sufficient coverage, the main and fragment images will be matched 306 and the matching metrics computed 307 (e.g., affine transform factor and stable keypoints) whereupon a query 308 of whether there is a match between the main and fragment images exist. If the images are determined not to match, a new image pair will be retrieved from the generated pairs 302 and analyzed. If a match does exists, a new group of matched images is generated 309 and matching key points are extracted from the group 310, and georeferencing of the stable key points in the main image 311 and the stable key points in the fragment image 312 are carried out. In a single image scenario the image is treated as a fragment 313.

Figure 5:
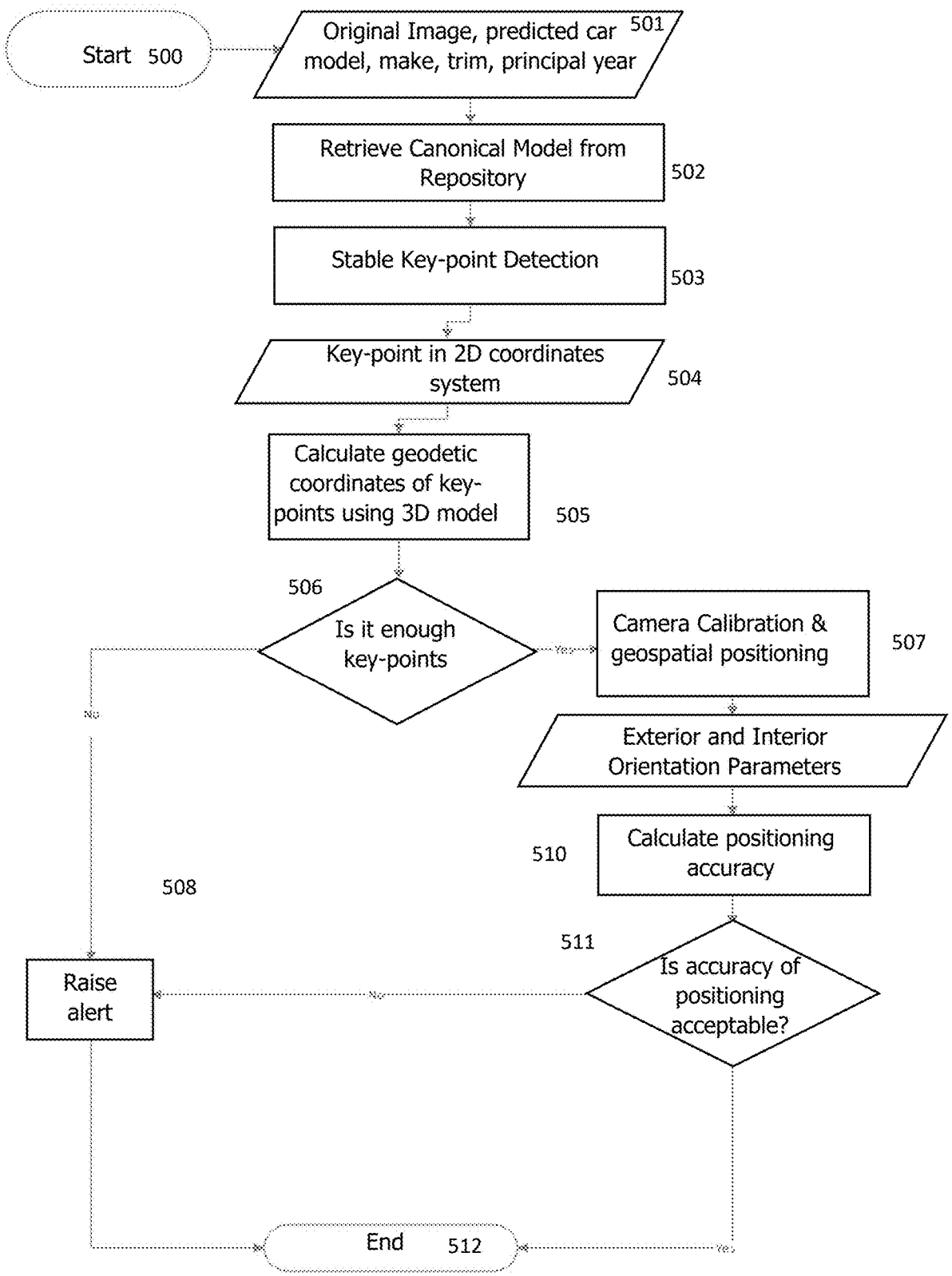

Turning now to FIGS. 4, and 5, showing flow charts illustrating an example of the process of georeferencing the damage print onto the identified part, for the main image and a fragment thereof respectively. As illustrated in FIG. 4, following identification of the MMTYC in the raw original main image 401, accessing the canonical (ground truth) 3D vehicle model is retrieved 402 and stable key points are detected 403 in the main image and mapped (co-registered) in 2D coordinate system, 404 either as a raster file or as vector file, followed by calculating geodetic coordinates 405 using the 3D model. The system queries 406 whether there are enough (too many) key points. If there are not enough key points, an alert will be raised 408, otherwise, using the metadata, camera calibration parameters (internal orientation parameters 409) and geospatial positioning (external orientation parameters 409) are processed 407, and positioning accuracy is calculated 410. The positioning accuracy is assessed as described herein and if acceptable, the co-registration (see e.g., FIG. 2, 216) and mapping of the georeferenced key points to the 3D model can take place.

Figure 6:
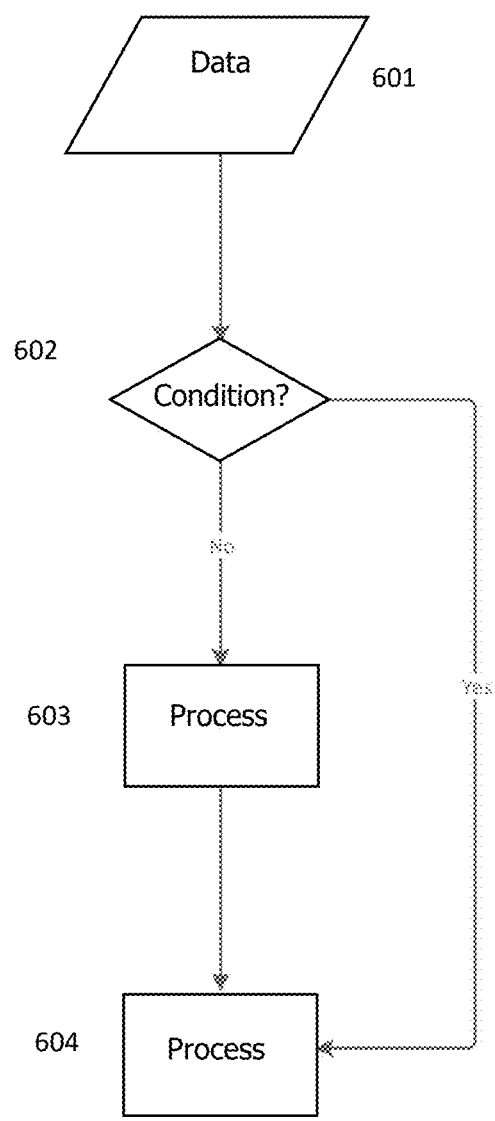
FIG. 6, is a flow chart illustrating an example of the processing performed per image captured and uploaded to the servers.

Turning now to FIG. 6, showing the template for image processing, where in any event data 601 is queried 602 regarding quality and upon positive determination the data will be processed using a first process 603, otherwise, using a subsequent process 604.

As used herein, the term "processor" is defined as including, but not necessarily being limited to, an instruction execution system such as a computer/processor based system, an Application Specific Integrated Circuit (ASIC), a computing device, or a hardware and/or software system that can fetch or obtain the logic from a non-transitory storage medium or a non-transitory computer-readable storage medium and execute the instructions contained therein. "Processor" can also include any controller, state-machine, microprocessor, cloud-based utility, service or feature, or any other analogue, digital and/or mechanical implementation thereof. In addition, the computer program (software and/or firmware), can comprise program code means for carrying out the steps of the methods described herein, as well as a computer program product comprising program code means stored on a medium that can be read by a computer, such as a hard disk, SATA CD-ROM, DVD, USB memory stick, or a storage medium that can be accessed via a data network, such as the Internet or Intranet, when the computer program product is loaded in the main memory of a computer and is carried out by the computer. Thus, the terms "non-transitory storage medium" and non-transitory computer-readable storage medium" are defined as including, but not necessarily being limited to, any media that can contain, store, or maintain programs, information, and data. Non-transitory storage medium and non-transitory computer-readable storage medium may include any one of many physical media such as, for example, electronic, magnetic, optical, electromagnetic, or semiconductor media.

More specific examples of suitable non-transitory storage medium and non-transitory computer-readable storage medium include, but are not limited to, a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

Non-transitory storage (Memory) device(s) as used in the methods described herein can be any of various types of non-transient memory devices or storage devices (in other words, memory devices that do not lose the information thereon in the absence of power). The term "memory device" is intended to encompass an installation medium, e.g., a CD-ROM, floppy disks, or tape device or a non-transient memory such as a magnetic media, e.g., a hard drive, optical storage, or ROM, EPROM, FLASH, etc. The memory device may comprise other types of memory as well, or combinations thereof. In addition, the memory medium may be located in a first computer in which the programs are executed, and/or may be located in a second different computer which connects to the first computer over a network, such as the Internet. In the latter instance, the second computer may further provide program instructions to the first computer for execution. The term "memory device" can also include two or more memory devices which may reside in different locations, e.g., in different computers that are connected over a network.

Further, the processor may be operably coupled to the various modules and components with appropriate circuitry. may also be used herein, the term(s) "operably coupled to", "coupled to", and/or "coupling" includes direct coupling between items and/or indirect coupling between items via an intervening item (e.g., an item includes, but is not limited to, a component, an element, a circuit, an engine, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

The term "module" is used herein to refer to software computer program code and/or any hardware or circuitry utilized to provide the functionality attributed to the module. Further, the term "module" or "component" can also refer to software objects or routines that execute on the computing system. The different components, modules, engines, and services described herein may be implemented as objects or processes that execute on the computing system (e.g., as separate threads). Likewise, "BMS" (see e.g., FIG. 1, 100), refers to a network device which receives data at multiple input ports and provides that data to an output port (e.g., capable of returning a value in an ARP table), for transmission over a communication link, and may also include computer networking devices such as a hub, router, bridge, gateway, multilayer switch and the like. In an exemplary implementation, BMS 810 is a network switch configured to support layer 3 switching/Routing.

Unless specifically stated otherwise, as apparent from the following discussions, it is appreciated that throughout the specification discussions utilizing terms such as "processing," "loading," "in communication," "detecting," "calculating," "determining", "analyzing," or the like, refer to the action and/or processes of a computer or computing system, or similar electronic computing device, that manipulate and/or transform data represented as physical, such as a transistor architecture into other data similarly represented as physical and structural layers.

As may also be used herein, the terms "central processing module" (CPM), "module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions (in other words, firmware). The processor, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory, random access memory, transient memory, non-transient memory, static memory, dynamic memory, flash memory, cache memory, and/or any device that stores digital information.

Note that if the processor, module, servers, network switches etc., processing circuit, and/or processing unit includes more than one processing device, the processing devices may be centrally located or may be distributed (e.g., cloud computing via indirect coupling via a local area network and/or a wide area network). Still further it is noted that, the memory element may store, and processor, module, processing circuit, and/or processing unit executes, hard coded and/or operational instructions corresponding to at least some of the steps and/or functions illustrated in one or more of FIG. 1 elements. Such a memory device or memory element can be and is included in an example as an article of manufacture.

In the context of the disclosure, the term "operable" means the system and/or the device and/or the program, or a certain element or step is fully functional, sized, adapted and calibrated, comprises elements for, and meets applicable operability requirements to perform a recited function when activated, coupled, implemented, actuated, effected, realized, or when an executable program, such as the flow charts provided herein, is executed by at least one processor associated with the system and/or the device. In relation to systems and circuits, the term "operable" means the system and/or the circuit is fully functional and calibrated, comprises logic for, having the hardware and firmware necessary, as well as the circuitry for, and meets applicable operability requirements to perform a recited function when executed by at least one processor.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

All ranges disclosed herein are inclusive of the endpoints, and the endpoints are independently combinable with each other. "Combination" is inclusive of blends, mixtures, alloys, reaction products, and the like. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the location(s) includes one or more location). Reference throughout the specification to "one exemplary implementation", "another exemplary implementation", "an exemplary implementation", and so forth, when present, means that a particular element (e.g., step, feature, structure, and/or characteristic) described in connection with the exemplary implementation is included in at least one exemplary implementation described herein, and may or may not be present in other exemplary implementations. In addition, it is to be understood that the described elements may be combined in any suitable manner in the various exemplary implementations.

Accordingly, and in an exemplary implementation, provided herein is a computerized networked method of generating a damage print on a vehicle, implementable in a system comprising: a backend management server (BMS), a user access terminal; a vehicle; a vehicle database; and a damage print database, wherein the BMS further comprises a network communication module configured to communicate with the communication network, and a central processing module (CPM), in communication with the communication module, the vehicle database and the damage print database, the CPM further comprises at least one processor in communication with a non-volatile memory storage device, storing thereon a processor readable media with a set of executable instructions, configured, when executed to cause the at least one processor to: receive images, and generate the damage print, the method comprising: receiving at least one image associated with the vehicle damage from the user; using the at least one image, identifying the vehicle; identifying at least one damages part in the vehicle; georeferencing the damage on the identified damaged vehicle part; registering the georeferenced damage to a 3D model of the identified vehicle; and generating a unique damage print, wherein (i) identifying the vehicle further comprises: identifying at least one of: make, model, trim, year and principal color (MMTYC), and (ii) further comprising receiving from the user a plurality of images, each associated with the vehicle damage, wherein (iii) the plurality of images associated with the vehicle damage are captured at at least one of: a different distance, and a different angle relative to the damage, wherein (iv) the step of georeferencing is preceded by: from a vehicle database, retrieving a canonical 3D model rendering of the identified vehicle; isolating the damaged parts from the canonical model; comparing the images to the isolated undamaged parts obtained from the canonical model; and detecting a plurality of key points associated with surface anomalies on the images, (v) the step of georeferencing comprises: extracting a plurality of stable key points of the anomalies on the at least one image; referencing each stable key point on a two-dimensional (2D) coordinate system; using the canonical 3D model rendering, calculating geodetic coordinates of each stable key point; and geospatially positioning each stable key point onto the at least one damaged part, wherein (vi) the method further comprising: comparing the generated unique damage print to the damage prints stored on the damage print database; and if the generated damage print matches a unique damage print stored on the damage print database, generating a fraud alarm; else storing the generated unique damage print in the damage prints database, the method further (vii) comprising: from the plurality of images, generating a plurality of image pairs; for each image pair, estimating the area of vehicle covered in each image in the pair; using fragment matching, matching a first image to the second image in the pair for all image pairs determined to have at least one image in the image pair, that has sufficient vehicle area coverage, wherein the image that has sufficient vehicle area coverage is the main pair image and the second image in the pair is a fragment image; creating a matched pairs group; adding the matched image pairs to the matched pairs group; georeferencing the main image in the matched image pair, for each image pairs in the matched pairs group; georeferencing the fragment image in the matched image pair, for each image pairs in the matched pairs group, whereby (viii) the step of georeferencing each of the main image in the matched image pair, and each fragment image in the matched image pair is preceded by: from a vehicle database, retrieving a canonical 3D model rendering of the identified vehicle; isolating the undamaged parts from the canonical model; comparing the images to the isolated undamaged parts obtained from the canonical model; and detecting a plurality of points associated with surface anomalies on the images, (ix) the step of georeferencing, for each of the main image in the matched image pair, and each fragment image in the matched image pair, comprises extracting a plurality of stable key points of the anomalies on the at least one image; referencing each stable key point on a two-dimensional (2D) coordinate system; using the canonical 3D model rendering, calculating geodetic coordinates of each stable key point; and geospatially positioning each stable key point onto the at least one damaged part, wherein (x) the step of identifying the vehicle is preceded by: determine the presence of a vehicle in the image; and if there is no vehicle in the image, generating an alert; else identifying the vehicle, wherein (xi) the step of registering the georeferenced damage to the canonical 3D model rendering of the identified vehicle comprises: for each image captured, using the canonical 3D identified vehicle model, obtaining at least one of exterior orientation parameter, and interior orientation parameter of the at least one damaged part's image; using the at least one of exterior orientation parameter, and interior orientation parameter, performing ortho-rectification; detecting and positioning the plurality of the stable key points in the orthophoto coordinate system; using the canonical 3D model rendering, calculating geodetic coordinates of each stable key point; and geospatially positioning each stable key point onto the at least one damaged part, and further (xii) comprising: generating a list of damaged parts; storing the list of damaged parts and the unique damage print associated with that damaged part in the damage print database, wherein (xiii) the step extracting the plurality of stable key points of the anomalies on the at least one image, comprises: extracting a scale invariant feature transform (SIFT) feature of the at least one image; and using difference of Gaussian (DoG) scale-space over at least two scales, extracting the plurality of stable key points by, thereby obtaining the convolution of the original native image, and (xiv) eliminating edge points.

In another exemplary implementation, provided herein is a computerized networked system for providing fraud alarm comprising: a user access terminal; a vehicle; a vehicle database; a damage print database; and a backend management server (BMS), comprising a network communication module configured to communicate with the communication network, and a central processing module (CPM), in communication with the communication module, the vehicle database and the damage print database, the CPM further comprises at least one processor in communication with a non-volatile memory storage device, storing thereon a processor readable media with a set of executable instructions, configured, when executed to cause the at least one processor to: receive a plurality of images, each image associated with the vehicle damage from the user, each image taken at a different distance and angle relative to the damage; using the at least one image, identify the vehicle; Identify at least one damages part in the vehicle; georeference the damage on the identified damaged vehicle part; register the georeferenced damage to a 3D model of the identified vehicle; and generate a unique damage print, wherein (xv) the set of executable instruction, is further configured, when executed, to cause the at least one processor to: using the plurality of images, generate a plurality of image pairs; for each image pair, estimate the area of vehicle covered in each image in the pair; using fragment matching, match a first image to the second image in the pair for all image pairs determined to have at least one image in the image pair, that has sufficient vehicle area coverage, wherein the image that has sufficient vehicle area coverage is the main pair image and the second image in the pair is a fragment image; create a matched pairs group; add the matched image pairs to the matched pairs group; georeference the main image in the matched image pair, for each image pairs in the matched pairs group; and georeference the fragment image in the matched image pair, for each image pairs in the matched pairs group, wherein (xvi) before georeferencing each of the main image in the matched image pair, and each fragment image in the matched image pair, the set of executable instruction, is further configured, when executed, to cause the at least one processor to: retrieve a canonical 3D model rendering of the identified vehicle from the vehicle database; isolate the damaged parts from the canonical model; compare the images to the isolated damaged parts obtained from the 3D canonical model; and detect a plurality of points associated with surface anomalies on the images, wherein (xvii) wherein to georeference, for each of the main image in the matched image pair, and each fragment image in the matched image pair, the set of executable instruction, is further configured, when executed, to cause the at least one processor to: extract a plurality of stable key points of the anomalies on the at least one image; reference each stable key point on a two-dimensional (2D) coordinate system; using the canonical 3D model rendering, calculate geodetic coordinates of each stable key point; and geospatially position each stable key point onto the at least one damaged part, and wherein (xviii) to register the georeferenced damage to a 3D model of the identified vehicle, the set of executable instruction, is further configured, when executed, to cause the at least one processor to: for each image captured, using the canonical 3D identified vehicle model, obtain at least one of exterior orientation parameter, and interior orientation parameter of the at least one damaged part's image; using the at least one of exterior orientation parameter, and interior orientation parameter, perform ortho-rectification; detect and position the plurality of the stable key points in the orthophoto coordinate system; using the canonical 3D model rendering, calculate geodetic coordinates of each stable key point; and geospatially position each stable key point onto the at least one damaged part.

Although the foregoing disclosure has been described in terms of some exemplary implementations, other exemplary implementations will be apparent to those of ordinary skill in the art from the disclosure herein. Moreover, the described exemplary implementations have been presented by way of example only, and are not intended to limit the scope of the inventions. Indeed, the novel methods, programs, devices and systems described herein may be embodied in a variety of other forms without departing from the spirit thereof. Accordingly, other combinations, omissions, substitutions and modifications will be apparent to the skilled artisan in view of the disclosure herein.

What is claimed:

1. A computerized networked system for providing fraud alarm comprising:
   a. a user access terminal;
   b. a vehicle;
   c. a vehicle database;
   d. a damage print database; and
   e. a backend management server (BMS), comprising a network communication module configured to communicate with the communication network, and a central processing module (CPM), in communication with the communication module, the vehicle database and the damage print database, the CPM further comprises at least one processor in communication with a non-transitory memory storage device, storing thereon a processor readable media with a set of executable instructions, configured, when executed to cause the at least one processor to:
   i. receive a plurality of images, each image associated with the vehicle damage from the user, each image taken at a different distance and angle relative to the damage;
   ii. Identify at least one damaged part in the vehicle;
   iii. using the plurality of images, generate a plurality of image pairs;
   iv. for each image pair, estimate the area of vehicle covered in each image in the pair;
   v. using fragment matching, match a first image to the second image in the pair for all image pairs determined to have at least one image in the image pair, having a sufficient vehicle area coverage, wherein the image that has sufficient vehicle area coverage is a pair's main image and the second image in the pair is a pair's fragment image;
   vi. create a matched pairs group;
   vii. add the matched image pairs to the matched pairs group;
   viii. using at leat one image in at least one image pair, identify the vehicle;
   ix. retrieve a canonical 3D model rendering of the identified vehicle from the vehicle database;
   x. georeference the main image in the matched image pair, for each image pairs in the matched pairs group to the retrieved canonical 3D model;
   xi. isolate the damaged parts from the 3D canonical model;
   xii. compare the images to the isolated damaged parts obtained from the 3D canonical model;
   xiii. detect a plurality of points associated with surface anomalies on the images;

xiv. georeference the fragment image in the matched image pair, for each image parts in the matched pairs group;
xv. using photogrammetry, georeference the damage on the identified damaged vehicle part;
xvi. register the georeferenced damage to the 3D canonical model of the identified vehicle;
xvii. generate a unique damage fingerprint of the damaged part; and
xviii. if the damage fingerprint generated matches a unique damage print stored on the damage print database, generate a fraud alarm; else
xix. store the generated unique damage print in the damage prints database.

2. The system of claim 1, wherein to identify the vehicle using at least one image in at least one image pair, the set of executable instruction, is further configured, when executed, to cause the at least one processor to: identify at least one of: make, model, trim, year and principal color.

3. The system of claim 1, wherein of the set of executable instructions is further configured, prior to using at least one image in at least one image pair, identify the vehicle, to cause the at least one processor to:
   a. determine the presence of a vehicle in the image; and
   b. if there is no vehicle in the image, generate an alert; else
   c. identify the vehicle.

4. The system of claim 1, wherein to georeference, for each of the main image in the matched image pair, and each fragment image in the matched image pair, the set of executable instruction, is further configured, when executed, to cause the at least one processor to:
   a. extract a plurality of stable key points of the anomalies on the at least one image;
   b. reference each stable key point on a two-dimensional (2D) coordinate system;
   c. using the canonical 3D model rendering, calculate geodetic coordinates of each stable key point; and
   d. geospatially position each stable key point onto the at least one damaged part.

5. The system of claim 4, wherein to register the georeferenced damage to a 3D model of the identified vehicle, the set of executable instruction, is further configured, when executed, to cause the at least one processor to:
   a. for each image captured, using the canonical 3D identified vehicle model, obtain at least one of exterior orientation parameter, and interior orientation parameter of the at least one damaged part's image;
   b. using the at least one of exterior orientation parameter, and interior orientation parameter, perform ortho-rectification;
   c. detect and position the plurality of the stable key points in the orthophoto coordinate system;
   d. using the canonical 3D model rendering, calculate geodetic coordinates of each stable key point; and
   e. geospatially position each stable key point onto the at least one damaged part.

6. The system of claim 5, wherein the seto of executable instructions are further configured, when executed by the at least one processor to:
   a. generate a list of damaged parts; and
   b. store the list of damaged parts and the unique damage print associated with that damaged part in the damage print database.

7. The system of claim 4, wherein to extract the plurality of stable key points of the anomalies on the at least one image, the set of executable instructions is further configured, when executed by the at least one processor to:
   a. extract a scale invariant feature transform (SIFT) feature of the at least one image; and
   b. using difference of Gaussian (DoG) scale-space over at least two scales, extract the plurality of stable key points by, thereby obtaining the convolution of the original image.

8. The system of claim 7, wherein the set of executable instructions is further configured, when executed by the at least one processor to eliminate edge points.

* * * * *